June 4, 1963

L. R. GUTE 3,091,792

WINDSHIELD WIPER SYSTEM

Filed Aug. 8, 1960

INVENTOR.
LOREN R. GUTE
BY
W. E. Finken
HIS ATTORNEY

INVENTOR.
LOREN R. GUTE
HIS ATTORNEY

United States Patent Office 3,091,792
Patented June 4, 1963

3,091,792
WINDSHIELD WIPER SYSTEM
Loren R. Gute, Fairport, N.Y., assignor to General Motors Corporation, Detroit, Mich., a corporation of Delaware
Filed Aug. 8, 1960, Ser. No. 48,132
9 Claims. (Cl. 15—250.17)

This invention pertains to control systems for windshield wipers, and particularly to an improved control system for electric motor driven windshield wipers.

At the present time motor vehicles are equipped with power operated windshield wipers which can be continuously operated to clean the windshield. In most instances, the windshield wipers can be operated at different speeds, as selected by the operator, to suit the driving conditions so as to maintain a clear field of vision through the windshield. While present day windshield wiper systems are adequate to maintain a clear field of vision under rainy conditions, they are inadequate to maintain a clear field of vision under misty conditions wherein insufficient moisture collects on the windshield to warrant continuous operation of the wipers. Under misty conditions continuous operation of the wipers only serves to smear the windshield and impair vision therethrough, so that most drivers manipulate the wiper control to activate and inactivate the windshield wipers periodically when sufficient moisture collects on the windshield to permit effective cleaning thereof by the wipers.

Periodic manual manipulation of the wiper control to activate and inactivate the wipers necessarily interferes with the driver's control of the motor vehicle, and thus constitutes a driving hazard since it distracts the driver and thus prevents him from giving his full attention to road and traffic conditions. The present invention relates to an improved control system for power driven windshield wipers including means for automatically effecting intermittent operation of the wipers or continuous operation at the desired selected speed. Accordingly, among my objects are the provision of a windshield wiper control system including means for effecting intermittent operation of the windshield wipers; the further provision of a windshield wiper control system including an electrically operable timer for periodically activating and inactivating the windshield wipers to effect an automatic cycle of intermittent wiper operation; and the still further provision of a control system for electric motor driven windshield wipers including a thermally responsive bimetallic switch for automatically controlling intermittent operation of the wipers as selected by the operator.

The aforementioned and other objects are accomplished in the present invention by connecting interrupter means in the form of a thermally responsive bimetallic switch in the control circuit for the windshield wiper motor through a manual switch whereby the windshield wipers can be operated continuously at different selected speeds or intermittently as selected by the driver. Specifically, the improved control system for windshield wipers is disclosed in conjunction with a windshield cleaning system of the type disclosed in copending application Serial No. 718,719, filed March 3, 1958, now Patent No. 2,985,024, in the name of Peter R. Contant et al. and assigned to the assignee of this invention. Accordingly, the windshield cleaning system comprises a unidirectional electric motor having a variable throw crank which is connected by linkage means to a pair of spaced pivot shafts. Each pivot shaft has a wiper arm drivingly connected thereto carrying a wiper blade, the arrangement being such that the wiper blades are oscillated asymmetrically, or in phase opposition, across the outer surface of the windshield. Moreover, during running operation the wiper blades are oscillated throughout running strokes having predetermined inboard and outboard stroke limits, and when the wiper motor is inactivated, the variable throw crank is automatically adjusted to move the wiper blades to a depressed parked position beyond the inboard stroke end limit and into firm engagement with the lower reveal molding of the windshield.

The control system for the windshield wiper motor comprises a control switch having a park, or "off," position, a low speed position, a high speed position, and a pulse, or intermittent operation, position. Energization of the wiper motor is effected through a relay operated switch constituting the parking switch for the electric wiper motor, which is mechanically opened when the wiper blades arrive at their depressed parked positions. The manual switch controls the energization of the relay for closing the parking switch to initiate operation of the windshield wipers.

In the improved control circuit, a thermally responsive bimetallic switch or thermal timer, is connected in series with the relay when intermittent operation of the wipers is selected. Accordingly, the thermally responsive bimetallic switch will periodically make and break the energizing circuit for the relay and in this way effect intermittent operation of the wiper motor.

Three embodiments of the intermittent circuit control are disclosed herein, all of the embodiments operating to provide a substantially five to one time delay ratio. That is, during intermittent operation, the wipers will be "off" for a period substantially five times longer than they are "on," i.e. forty seconds "off" and eight seconds "on."

In the first embodiment, the bimetallic switch is connectible in series with the relay coil and responds to the current flowing through the control circuit to achieve the desired "on" and "off" time ratio. In the second embodiment, the modified bimetallic switch is connected in series with the relay coil, and the relay coil is shunted by a resistor so as to regulate the current flow in the control circuit. In the third embodiment the bimetallic switch includes its own heater which is connected in shunt relation with the relay coil.

Further objects and advantages of the present invention will be apparent from the following description, reference being had to the accompanying drawings, wherein preferred embodiments of the invention are clearly shown, and wherein similar reference numerals depict similar parts throughout the several views.

Figure 1:
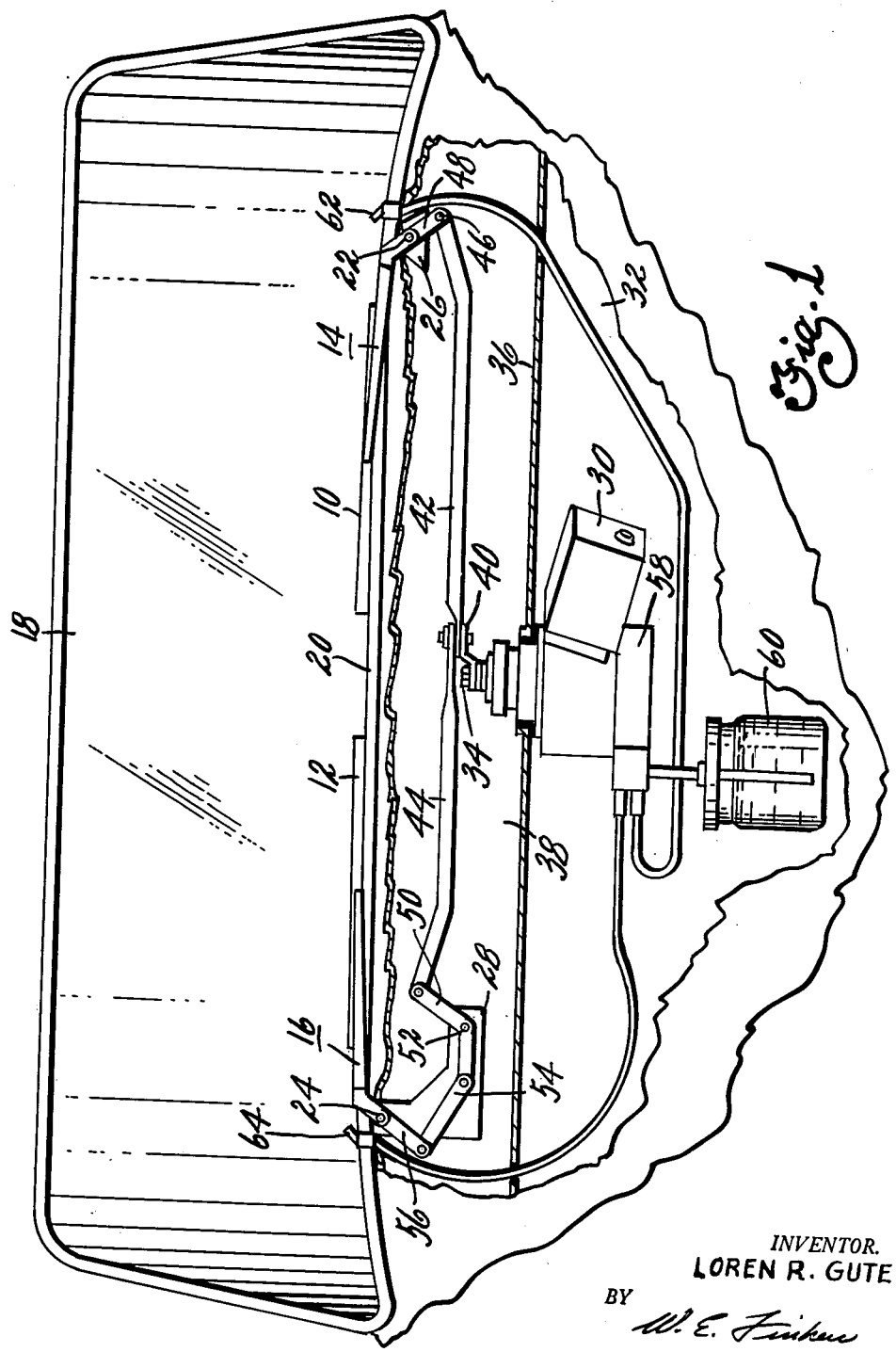
FIGURE 1 is a fragmentary view, partly in section and partly in elevation, of a vehicle equipped with the windshield cleaning control system of this invention.

With particular reference to FIGURE 1, a windshield cleaning system is shown comprising a pair of wiper blades 10 and 12 carried by arms 14 and 16 and oscillatable asymmetrically, or in phase opposition, across the outer surface of a windshield 18 having a lower reveal molding 20. The wiper arms 14 and 16 comprise conventional spring hinge connected inner and outer sections, the inner sections of which are drivingly connected to spaced pivot shafts 22 and 24, respectively, mounted beneath the lower reveal molding 20 and journalled in brackets 26 and 28, respectively. The wiper blades 10 and 12 are driven by power means in the form of an electric motor 30 suitably attached to the firewall 32 of the vehicle and having a rotating output shaft 34 which projects upwardly through the lower wall 36 of the plenum chamber 38. The shaft 34 has a radially extending crank arm 40 attached thereto to which the inner ends of connecting links 42 and 44 are rotatably connected.

The outer end of link 42 is pivotally connected at 46 to a crank arm 48 attached to the pivot shaft 22. The outer end of connecting link 44 is pivotally connected to one end of a bellcrank 50, having an intermediate pivot 52 on the bracket 28. The other end of the bellcrank 50 is pivotally connected to a link 54 which is also pivotally connected to a crank arm 56 attached to the pivot shaft 24. In accordance with the teachings of the aforementioned copending application Serial No. 718,789, now Patent No. 2,985,024 the wiper blades 10 and 12 are oscillatable throughout their running strokes, and when the wiper motor 30 is inactivated the wiper blades are automatically moved to the depressed parked position whereat they firmly engage the lower reveal molding 20, as depicted in FIGURE 1. In addition, the wiper motor 30 may be used to drive a washer pump mechanism 58 for supplying cleaning fluid from a reservoir 60 to a pair of nozzles 62 and 64 mounted adjacent the pivot shafts 22 and 24, respectively.

Figure 2:
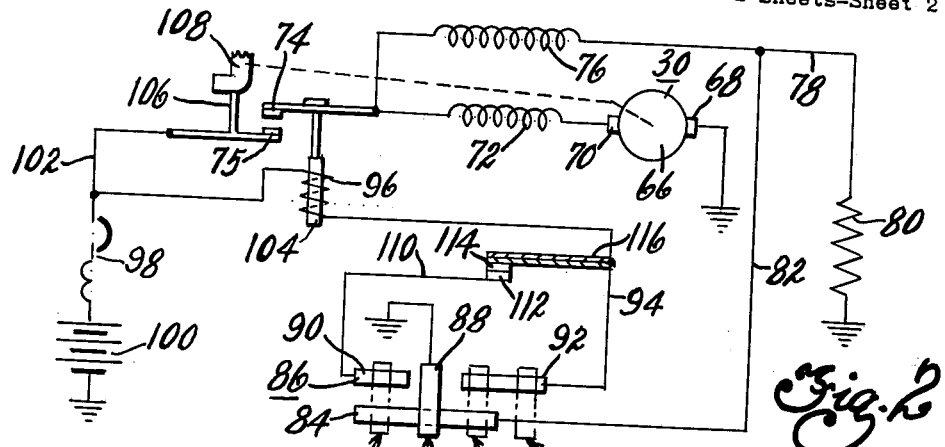
FIGURE 2 is a schematic wiring diagram of one embodiment of the improved control system.

With reference to FIGURE 2, the wiper motor 30 is of the direct current unidirectional type including an armature 66 having a commutator engageable by brushes 68 and 70. Brush 68 is shown connected to ground, while brush 70 is connected to one end of series field winding 72. The other end of series field winding 72 is conntcted to a movable contact 74 constituting part of the parking switch, as well as to one end of the shunt field winding 76. The other end of the shunt field winding 76 is connected to a wire 78. The wire 78 is connected to one end of a resistor 80, the other end of which is grounded, and to a wire 82 which is connected to a stationary contact 84 of a manual wiper control switch 86. The manual wiper control switch includes a grounded movable bridging contact 88 and stationary contacts 90 and 92 in addition to the stationary contact 84.

The stationary contact 92 is connected by a wire 94 to one end of a relay coil 96, the other end of which is connected through a thermal overload circuit breaker 98 to one terminal of a battery 100, the other terminal of which is connected to ground. In addition, the battery 100 is also connected through the overload circuit breaker 98 and wire 102 to the other contact 75 of the parking switch. Structurally, the parking switch contacts 74 and 75 comprise leaf springs inherently resiliently biased towards each other. The contact 74 is connected to an actuator 104 operated by the relay coil 96 so that whenever the relay coil 96 is energized the contact 74 is moved into engagement with the contact 75. When the relay coil 96 is deenergized the contact 74 remains in engagement with the contact 75 until the contact 75 is deflected through an actuator 106 by a motor driven cam 108 when the wiper blades arrive at their depressed positions.

The stationary contact 90 of the manual wiper control switch 86 is connected by a wire 110 to a switch contact 112 which is engageable by a switch contact 114 carried by a bimetal strip 116. The bimetal strip 116 is electrically connected to the wire 94. The contacts 112 and 114 and the bimetal strip 116 constitute a thermal timer for controlling intermittent operation of the wiper motor at the selection of the operator.

Operation of the improved windshield cleaning system is as follows. When the movable contact 88 of the manual control switch 86 is moved from the parked or "off" position to the low speed position, stationary contacts 84 and 92 are bridged thereby energizing the relay coil 96 from the grounded contact 88, the contact 92, the wire 94, the relay coil 96, the overload switch 98 and the battery 100. When the relay coil 96 is energized, the actuator 104 moves the contact 74 into engagement with the contact 75 thereby energizing the wiper motor 30 from the battery through the overload switch 98, the wire 102, the contacts 75 and 74, the series field winding 72 and the armature 66. The shunt field winding 76 is fully energized through the parking switch contacts 74 and 75 through wire 78 and 82 and the contacts 84 and 88. Accordingly, the wiper motor will be energized for low speed rotation thereby oscillating the wiper blades 10 and 12 throughout their running strokes. To obtain high speed operation of the wiper motor 30, the bridging contact 88 is moved to the high speed position wherein it engages only the stationary contact 92. Under these conditions, the relay coil 96 will continue to be energized, while the shunt field 76 will be energized at reduced voltage through resistor 80 thereby increasing the speed of rotation of the motor 30.

When the manual control 88 is moved from either the low or the high speed positions to the parked position, the relay coil 96 is deenergized. However, the contacts 74 and 75 remain in engagement due to their inherent resiliency until the wiper blades 10 and 12 arrive at their depressed parked positions, at which time the cam 108 will move contact 75 out of engagement with contact 74 through actuator 106 to deenergize the motor 30.

In order to effect intermittent operation of the wiper blades, the manual control switch is moved to the pulse position whereat the movable contact 88 bridges contacts 90 and 84. Under these conditions, the relay coil 96 will be energized through the contacts 112 and 114 of the thermal timer, while the low speed energizing circuit for the wiper motor will be completed through contacts 84 and 88. The current for energizing relay coil 96 flows through the bimetallic strip 116 and in so doing heats the bimetal strip which is designed to warp at a predetermined temperature thereby separating contacts 112 and 114 to deenergize the relay coil 96. When the relay coil 96 is deenergized, the wiper motor will be automatically arrested through cam operation of the parking switch contacts 74 and 75 and when the wiper blades arrive at their depressed parked positions. The characteristics of the bimetal strip 116 are chosen to give a predetermined time delay prior to automatically reengaging contacts 112 and 114. For example, with the circuit illustrated in FIGURE 2, the characteristics of the bimetal strip are such as to require eight seconds to raise the temperature of the bimetal strip so as to cause warping thereof to separate contacts 112 and 114. Thereafter, it will require approximately forty seconds for the bimetal strip to cool sufficiently to reengage contacts 112 and 114. Accordingly, when the manual wiper switch 86 is in the pulse position, the wipers will be operated intermittently with an "on" time of eight seconds and an "off" time of forty seconds. This intermittent operation of the wiper blades will be used under misty conditions where continuous operation of the wiper blades would only result in smearing of the windshield and thus impair the driver's vision therethrough.

Figure 3:
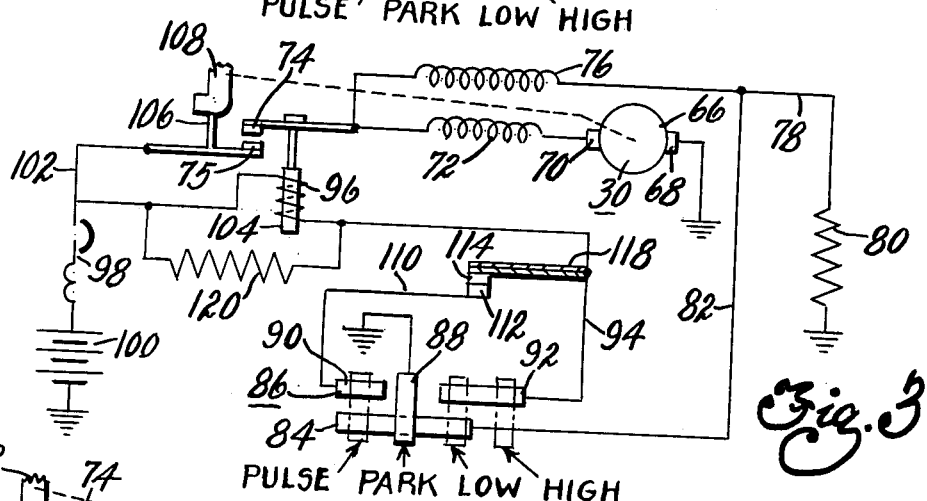
FIGURE 3 is a schematic wiring diagram of the second embodiment of the improved control system.

With reference to FIGURE 3, a slightly modified form of thermal timer is depicted comprising a bimetal strip 118 carrying contacts 114 engageable with contact 112, and wherein the relay coil 96 is shunted by a resistor 120. The resistor 120 lowers the effective resistance of the control circuit thereby increasing the current flow therethrough. Since the current flow through the control circuit must flow through bimetal strip 118, the characteristics of the bimetal strip 118 are tailored so that the desired twelve to one ratio of "off" to "on" time is achieved.

Figure 4:
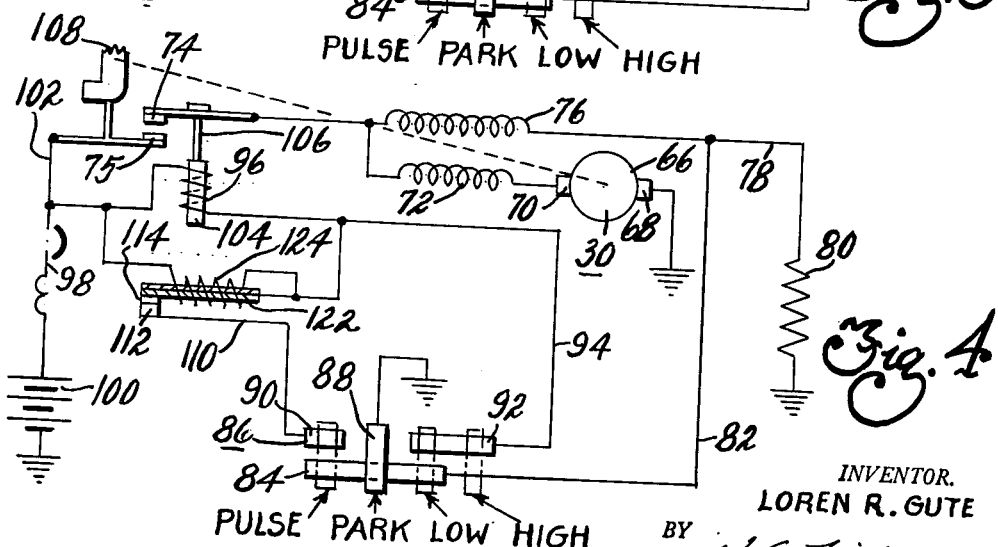
FIGURE 4 is a schematic wiring diagram of a third embodiment of the improved control system.

Referring to FIGURE 4, a further modification of a thermal timer is depicted wherein the thermal time comprises a bimetal strip 122 carrying contact 114, which is responsive not only to the heat produced by current flowing therethrough but also to the heat produced by a resistor 124 connected in shunt around the relay coil 96 and encompassing the bimetal strip 122. Again, the characteristics of the bimetal strip 122 are tailored so as to achieve the desired twelve to one ratio of "off" and "on" time during intermittent wiper operation.

Operation of the modified embodiment shown in FIGURES 3 and 4 is identical with the operation of the control circuit as described in conjunction with FIGURE 2. That is, the thermal timer is only connected in the circuit during intermittent operation of the wiper motor when the manual control switch 86 is moved to the pulse position whereat the movable contact 88 bridges contacts 90 and 84. Moreover, when the wiper motor 30 is operated continuously at the low or high speeds the relay coil 46 is continuously energized directly through contacts 88 and 92.

While the embodiments of the invention as herein disclosed constitute preferred forms, it is to be understood that other forms might be adopted.

What is claimed is as follows:

1. A windshield cleaning system having a wiper, an electric motor operable to move the wiper back and forth across the surface of a windshield and park said wiper in a predetermined position, an energizing circuit for said motor, a manual control in said energizing circuit having a first position for effecting continuous energization of said motor and a second position, automatically operable interrupter means connected in said energizing circuit so as to be energized concurrently with said electric motor when the manual control is in the second position for periodically making and breaking said energizing circuit to effect intermittent operation of said wiper, and automatic means operable to park said wiper when the energizing circuit for said motor is opened by said interrupter means.

2. A windshield cleaning system having a wiper, an electric motor operable to move the wiper back and forth across the surface of a windshield and park said wiper in a predetermined position, an energizing circuit for said motor, a manual control in said energizing circuit having a first position for effecting continuous energization of said motor and a second position, a thermal timer connected in the energizing circuit so as to be energized concurrently with said electric motor when the manual control is in the second position for periodically making and breaking said energizing circuit to effect intermittent operation of said wiper, and automatic means operable to park said wiper when the energizing circuit of said motor is opened by said thermal timer.

3. Windshield wiper control mechanism including, a wiper, an electric motor operable to oscillate said wiper and park said wiper in a predetermined position, an electric power source, an energizing circuit for said motor including a parking switch, a relay for closing said parking switch, an energizing circuit for said relay including a manual control switch having a first position for effecting continuous energization of said relay and a second position, interrupter means energized concurrently with said relay and operable to automatically effect intermittent operation of said relay and said motor when the manual control switch is in the second position, and means driven by said motor for opening said parking switch to automatically park said wiper upon deenergization of said relay by said interrupter means.

4. A control system for a wiper operable by an electric motor including, an electric power source, an energizing circuit for said motor including a parking switch connected directly to said power source, the energizing circuit for said motor being completed when the parking switch is closed and interrupted when the parking switch is open, a relay for closing said parking switch, an energizing circuit for said relay including a manual wiper control switch connected to said power source and having first, second and third positions, the energizing circuit for said relay being completed when the manual wiper control switch is in said first position so as to effect continuous operation of said motor and open when said manual wiper control switch is in said second position so as to arrest operation of said motor, interrupter means connected in series with said relay when said manual control switch is in said third position for periodically making and breaking the energizing circuit for said relay so as to effect intermittent operation of said motor, and means driven by said motor for opening said parking switch to deenergize said motor at a predetermined wiper position when the energizing circuit for said relay is interrupted by either said manual switch or said interrupter means.

5. A control system for a wiper operable by an electric motor including, an electric power source, an energizing circuit for said motor including a parking switch connected directly to said power source, the energizing circuit for said motor being completed when the parking switch is closed and interrupted when the parking switch is open, a relay for closing said parking switch, an energizing circuit for said relay including a manual wiper control switch connected to said power source and having first, second and third positions, the energizing circuit for said relay being completed when the manual wiper control switch is in said first position so as to effect continuous operation of said motor and open when said manual wiper control switch is in said second position so as to arrest operation of said motor, a thermal timer connected in series with said relay when said manual control switch is in said third position for periodically making and breaking the energizing circuit for said relay so as to effect intermittent operation of said motor, and means driven by said motor for opening said parking switch to deenergize said motor at a predetermined wiper position when the energizing circuit for said relay is interrupted by either said manual switch or said thermal timer.

6. The control system set forth in claim 5 wherein said thermal timer comprises a bimetallic switch.

7. The control system set forth in claim 6 wherein said bimetallic switch includes a pair of contacts and a bimetal strip connected in series with said relay.

8. The control system set forth in claim 6 wherein said bimetallic switch comprises a pair of contacts and a bimetal strip connected in series with said relay, and wherein said relay is shunted by a resistor for regulating the current flow through said bimetal strip.

9. The control system set forth in claim 6 wherein said bimetallic switch comprises a pair of contacts and a bimetal strip connected in series with said relay, and wherein said bimetal strip is encompassed by a resistance heater, the resistance heater being connected in shunt relation with the relay.

References Cited in the file of this patent

UNITED STATES PATENTS

| 2,364,603 | Coxom et al. | Dec. 12, 1944 |
| 2,732,523 | Schneff | Jan. 24, 1956 |

FOREIGN PATENTS

| 521,182 | Italy | Mar. 25, 1955 |